US012563513B2

(12) United States Patent (10) Patent No.: US 12,563,513 B2
Breuer et al. (45) Date of Patent: Feb. 24, 2026

(54) METHOD FOR EVENT REPORTING IN A NETWORK

(71) Applicant: Telit Cinterion Deutschland GmbH, Munich (DE)

(72) Inventors: Volker Breuer, Botzow (DE); Joel Demarty, La Ciotat (FR)

(73) Assignee: Telit Cinterion Deutschland GmbH, Munich (DE)

(*) Notice: Subject to any disclaimer, the term of this patent is extended or adjusted under 35 U.S.C. 154(b) by 400 days.

(21) Appl. No.: 18/043,073

(22) PCT Filed: Aug. 24, 2021

(86) PCT No.: PCT/EP2021/073386
§ 371 (c)(1),
(2) Date: Feb. 27, 2023

(87) PCT Pub. No.: WO2022/043324
PCT Pub. Date: Mar. 3, 2022

(65) Prior Publication Data
US 2023/0319749 A1 Oct. 5, 2023

(30) Foreign Application Priority Data
Aug. 31, 2020 (EP) .................................... 20315397

(51) Int. Cl.
*H04W 56/00* (2009.01)
*H04J 11/00* (2006.01)

(52) U.S. Cl.
CPC ....... *H04W 56/002* (2013.01); *H04J 11/0073* (2013.01); *H04W 56/0015* (2013.01)

(58) Field of Classification Search
CPC ........... H04J 11/0073; H04W 56/0015; H04W 56/002
See application file for complete search history.

(56) References Cited

U.S. PATENT DOCUMENTS 10,009,413 B2 * 6/2018 Wohlert .................. H04L 65/80
10,123,289 B2 * 11/2018 Jung .................. H04W 56/0025
(Continued)

FOREIGN PATENT DOCUMENTS

EP          2772086          9/2014
WO     WO 03/007508     1/2003

OTHER PUBLICATIONS

International Search Report and Written Opinion for PCT Application No. PCT/EP2021/073386, mailed on Nov. 17, 2021.
3GPP TS36.133 v16.6.0, 3rd Generation Partnership Project; "Technical Specification Group Radio Access Network; Evolved Universal Terrestrial Radio Access (E-UTRA); Requirements for support of radio resource management" (Release 16), Jun. 2020.
(Continued)

*Primary Examiner* — Wutchung Chu
(74) *Attorney, Agent, or Firm* — PEARL COHEN ZEDEK LATZER BARATZ LLP

(57) ABSTRACT
The present invention relates to determine a common application time-base for different positionally fixed wireless stations, which perform a timing application in different unsynchronized radio-access-network cells, a method comprises providing to the wireless stations a timing-report instruction. It instructs the wireless stations to perform a cell-search procedure and to determine a respective set of time synchronization information retrieved from any detected base station with reference to its respective time base. If more than one set of time synchronization information from a corresponding number of detected base stations has been retrieved, the wireless stations provides timing synchronization data indicative of the retrieved sets of time synchronization information from the detected base stations. An application server receives the at least one timing report and determines a common application time-base for the different detected base stations, using the different sets of timing synchronization data provided.

12 Claims, 5 Drawing Sheets

(56) References Cited

U.S. PATENT DOCUMENTS

| 10,327,169 | B2 * | 6/2019 | Lee | H04W 52/14 |
| 11,638,121 | B2 * | 4/2023 | Akkarakaran | H04W 4/029 |
| | | | | 455/456.1 |
| 2005/0037786 | A1 | 2/2005 | Edge | |
| 2006/0099992 | A1 * | 5/2006 | Ju | H04N 21/6131 |
| | | | | 455/558 |
| 2008/0300017 | A1 * | 12/2008 | Choi | H04N 21/4182 |
| | | | | 455/558 |
| 2010/0323718 | A1 | 12/2010 | Jen | |
| 2011/0158164 | A1 * | 6/2011 | Palanki | H04W 74/04 |
| | | | | 370/328 |
| 2014/0169244 | A1 * | 6/2014 | Polisetty | H04W 36/0072 |
| | | | | 370/336 |
| 2016/0353397 | A1 * | 12/2016 | Jung | H04W 8/005 |
| 2017/0013573 | A1 * | 1/2017 | Jung | H04W 56/001 |
| 2017/0251456 | A1 | 8/2017 | Radulescu et al. | |
| 2018/0199395 | A1 * | 7/2018 | Huang-Fu | H04W 48/20 |
| 2019/0191308 | A1 * | 6/2019 | Prasad | H04W 28/10 |
| 2021/0021327 | A1 * | 1/2021 | Jorguseski | H04W 72/12 |
| 2021/0105579 | A1 * | 4/2021 | Akkarakaran | G01S 5/0236 |
| 2021/0219253 | A1 * | 7/2021 | Van Phan | H04W 56/004 |
| 2022/0264433 | A1 * | 8/2022 | Xiao | H04L 5/0098 |
| 2023/0319749 | A1 * | 10/2023 | Breuer | H04J 11/0073 |
| | | | | 370/350 |

OTHER PUBLICATIONS

3GPP TS36.214 v16.1.0 3$^{rd}$ Generation Partnership Project; "Technical Specification Group Radio Access Network; Evolved Universal Terrestrial Radio Access (E-UTRA); Physical layer; Measurements", (Release 16), Jun. 2020.

3GPP TS36.104 v16.6.0, 3rd Generation Partnership Project; "Technical Specification Group Radio Access Network; Evolved Universal Terrestrial Radio Access (E-UTRA); Base Station (BS) radio transmission and reception", (Release 16), Jun. 2020.

3GPP TS36.304 v16.1.0, 3rd Generation Partnership Project; "Technical Specification Group Radio Access Network; Evolved Universal Terrestrial Radio Access (E-UTRA); User Equipment (UE) procedures in idle mode", (Release 16), Jun. 2020.

3GPP TS36.211 V16.2.0, 3rd Generation Partnership Project;"Technical Specification Group Radio Access Network; Evolved Universal Terrestrial Radio Access (E-UTRA); Physical channels and modulation", (Release 16), Jun. 2020.

3GPP TS38.211 V16.2.0, 3rd Generation Partnership Project; Technical Specification Group Radio Access Network; NR; Physical channels and modulation, (Release 16), Jun. 2020.

3GPP TS25.133 v16.0.0, 3rd Generation Partnership Project;"Technical Specification Group Radio Access Network; Requirements for support of radio resource management (FDD)", (Release 16), Jun. 2020.

* cited by examiner

|  | Reporting UE | Other UEs in cell | Timing Difference | Timing Correction |
|---|---|---|---|---|
| BS1 | UE1 | UE4 | 0 | 0 |
| BS2 | UE1, UE2 | - | +5Ts | -5Ts |
| BS3 | UE2 | UE5, UE6 | -2Ts | +2Ts |
| BS4 | UE2 | UE7 | +7Ts | -7Ts |

FIG. 5

METHOD FOR EVENT REPORTING IN A NETWORK

CROSS-REFERENCE TO RELATED APPLICATIONS

This application is a National Phase Application of PCT International Application No. PCT/EP2021/073386, International Filing Date Aug. 24, 2021, claiming the benefit of European Patent Application No. 20315397.8, filed Aug. 31, 2020, which are hereby incorporated by reference in their entirety.

FIELD OF THE INVENTION

The present invention is in the field of timing, i.e., a determination of a point in time associated with the occurrence of an event.

BACKGROUND OF THE INVENTION

Timing is performed to exactly determine a point of time of an either upcoming or passed event with respect to a reference time base. Timing is an application that is useful in different fields of technology. Considering as a first exemplary timing application the timing of an upcoming event, so to say timing in a forward direction, many application processes for instance rely on a synchronization of events generated by different processing entities. An exact control of the timing of the events generated by the different processing entities may be crucial for the application. Considering as a second exemplary timing application the timing of passed events, so to say timing in a backward direction, an exact timing for instance of a process event detected by different sensing entities having fixed respective positions can contribute to determining event location information, and thus help in an identification of an originally unknown position of occurrence of the process event. For both timing applications, be it in forward or backward direction, an exact common time base for all different entities involved in the timing application is an essential requirement.

As the use of cellular wireless communication spreads more and more into industrial process control and analysis, the precise time base of base stations of cellular wireless communication network becomes increasingly used for the provision of a reference time base for different process or sensing entities implemented as wireless stations which operate as end nodes in the cellular wireless communication network. Wireless stations operated in synchronized cellular wireless communication networks can thus easily be used for the timing of events in forward or backward direction.

However, different network cells of a given public land mobile network (PLMN), or, on a higher level, PLMNs of different network operators are not always operated synchronously. A PLMN will herein be also referred to as a network. For instance, networks operating according to an LTE or an UMTS FDD standard are not synchronized. This means that not all base stations of the network have the same time base, and implies that the base stations provide different time bases to the end nodes they serve. Furthermore, different networks of serving the same area may use different time references. Accordingly, different wireless stations attached to different base stations in unsynchronized networks have no common reference time base. This is detrimental for the performance of wireless stations in processes relying on an exact performance of their timing application.

SUMMARY OF THE INVENTION

In the following, different aspects of the invention disclosed in this specification and in the enclosed claims and drawings will be described.

As an overview of the different aspects of the invention, a first aspect is formed by a method for determining a common application time-base for different positionally fixed wireless stations, which are operated as end nodes in different unsynchronized radio-access-network cells. A second aspect is a method for determining respective sensing times associated with a sensing event sensed by different remote, positionally fixed wireless sensor stations, which are operated as end nodes in performing a sensing timing application in different unsynchronized radio-access-network cells. A third aspect is a method for operating a wireless station. A fourth aspect is an application-synchronization server for determining a common application time-base for different positionally fixed wireless stations, which are operated as end nodes in performing a timing application in different unsynchronized radio-access-network cells. A fifth aspect is a sensing-application server for determining points in time associated with a remote-sensing event sensed by different remote, positionally fixed wireless sensor stations, which are operated as end nodes in performing a sensing timing application in different unsynchronized radio-access-network cells. A sixth aspect is computer program related to the method of the first aspect. A seventh aspect is a computer program related to the third aspect.

The following turns to a more detailed description of the different aspects of the present invention.

According to a first aspect of the present invention, a method is provided for determining a common application time-base for different positionally fixed wireless stations, which are operated as end nodes in performing a timing application in different unsynchronized radio-access-network cells. The method comprises providing to the wireless stations a timing-report instruction, the timing-report instructing the wireless stations
    to perform a cell-search procedure,
    to retrieve a cell identifier associated with the respective radio-access-network cell operated by any responding base station,
    to determine timing synchronization data indicative of respective time synchronization information retrieved from any detected base station with reference to its respective time base;
    if more than one set of timing synchronization data from a corresponding number of responding base stations has been retrieved by a given one of the wireless stations, to provide a timing report indicative of a respective desynchronization between the different time bases of the detected base stations;
  receiving at least one timing report from at least one wireless station;
  determining a common application time-base for the different responding base stations, using the different sets of timing synchronization data provided in the timing report.

The method of the invention is based on the recognition that positionally fixed wireless stations performing a timing application in different unsynchronized radio-access-network cells with respect to an event do not achieve a precise timing of an event. Since the wireless stations base their timing information on the respective time base provided by the base station they are using, and since different base stations are not mutually synchronized, an event is timed differently by wireless stations that use different base stations. This creates uncertainty and inaccuracy regarding the exact true time of the event.

According to the present invention, an application server controls the operation of different positionally fixed wireless stations, which are operated as end nodes in performing a timing application in different unsynchronized radio-access-network cells.

The present invention proposes control of an initialization of a cell search procedure by an application server to obtain and evaluate timing reports from certain wireless stations based on the respective outcomes of performing the cell search procedure. To control the initialization of the cell search procedure, a timing-report instruction is provided to the wireless stations by the application server. The cell search procedure to be performed by the wireless stations is as such a known procedure and a basic function of that is commonly used by any wireless station suited for operation in a wireless cellular communication network. It serves, among other purposes, to select a base station, to prepare a change of the selected base station in a handover, and to achieve, inter alia, time and frequency synchronization between the wireless station and the selected base station in the course of initial startup and handover. An external triggering of a cell search procedure, as proposed by the present invention is, however, unknown.

With the timing-report instruction, the application server further instructs the wireless stations to provide a timing report, at least in case a given one of the wireless stations has retrieved more than one set of time synchronization information from a corresponding number of detected base stations. The timing reports received by the application server are used by the application server in determining a common application time-base for the different detected base stations, using the different sets of timing synchronization data provided in the timing report.

The common application time base is a common time base used by the application server to individually correct any timing information received from the wireless stations during performance of their application function. The common application time base may thus for instance be defined very simply as a set of timing corrections for all base stations (except for a selected base station that is used as a reference).

While a timing report providing timing synchronization data about only one base station does not support achieving a common application time-base, a timing report indicative of a respective desynchronization between the different time bases of the different base stations detected by one wireless stations does allow the application server deriving a common application time-base for these base stations. As is well known, the time synchronization information retrieved from two or more base stations by the same wireless stations is based on a the reception and detection of a predetermined synchronization event by the wireless station.

As is known from the cell search procedure, the synchronization event detected by the wireless station is associated with a pre-defined signal waveform in a signalling sequence that is periodically broadcast by each base station via a known signalling channel. A relative time shift between the detection of this synchronization event from the different base stations can be used to determine a desynchronization, for instance in the form of a time difference. Since the position of the wireless stations is fixed, a timing advance between the respective base station and the wireless station is known and can be cancelled out by a simple calculation step in the course of the determination of the common application time-base for the different detected base stations.

The method of the present invention thus makes use of the fact that the respective geographical ranges covered by different base stations have a geographical overlap. Therefore, certain wireless stations positioned in an overlap range of different base stations are able to detect more than one base station in a cell search procedure. Given the mentioned advantages of the method of the invention, a deliberate positioning of certain dedicated wireless stations in overlap regions of cells in the setup of an application arrangement of wireless stations is proposed to achieve a virtual synchronization, i.e., a common application time-base for these base stations is achieved for the purpose of the application.

The method thus allows determining a difference in time synchronization information retrieved from all base stations detected by a given wireless station, and in turn achieves a virtual synchronization by suitable calculation on the side of the application server.

Different implementations of a suitable timing report will be disclosed further below in the context of the description of embodiments. Just for the purpose of illustrating this feature, the timing report may be as simple as a message indicative of the retrieved cell identifiers and the associated time synchronization information retrieved from the respective base stations.

In the following, embodiments of the method of the first aspect of the invention will be described.

One embodiment of the method of the first aspect comprises providing the timing-report instruction as an application layer protocol instruction on an application protocol layer. Preferably, the timing-report instruction is provided by the application server as an AT command (Hayes command). As such, an embodiment of the present invention includes providing a new, heretofore unknown AT command that comprises the timing report instruction. In other embodiments, a further new AT command is used that includes as payload information the measured timing difference. In known AT commands, the timing difference is not contained, because the timing difference is only used for radio-internal activities such as handover, whilst it has not been used so far by an application. Hence no suitable AT command has been defined in the prior art. However, 3GPP standards, for radio purposes, define suitable measurements providing the measured timing difference with a suitable related accuracy, e.g., TS36.133 in the context of radio resource management (RRM) procedures, and TS36.214, which defines a measurement procedure.

To allow increasing an accuracy of the common application time-base, some embodiments of the method comprise performing the method of the first aspect or one of its embodiments at different points in time in a plurality of repetition runs; and using the sets of timing synchronization data obtained in the different repetition runs to determine the common application time-base for the different responding base stations.

For instance, the application server determines a mean value of the sets of time synchronization information associated with a given base station and retrieved at different times can be determined. Time synchronization information from a base station is rather stable in the experience of the present inventors. Therefore, the determination of the mean value is hardly affected by a desynchronization drift, unless the time difference between repetitions of the cell search procedure becomes much larger than a typical time constant associated with the drift. The virtual synchronization may be maintained and updated according to a specified accuracy limit. An example is an accuracy of timing expressed in a timing deviation smaller than 0.1 ppm.

In preferred embodiments, determining the common application time-base for the different responding base stations from a given timing report comprises determining the respective desynchronization between the different time bases of the responding base stations;

determining a timing correction with respect to a selected one the time bases for all other of the responding base stations, for use in correcting timing information provided in a time stamp provided with reference to the time base.

In this embodiment, the time base of a selected one of the detected base stations is taken as a reference time base, and the desynchronization of the time bases of other detected base stations is determined with respect to that selected reference time base. Thus, the respective timing correction for each of the base stations other than the selected one is determined with respect to the reference time base. This process is particularly simple. Suitably, the time base of that base station to which the reporting wireless station is currently attached is taken as the reference time base.

A second aspect of the present invention is a method for determining respective sensing times associated with a sensing event sensed by different remote, positionally fixed wireless sensor stations, which are operated as end nodes in performing a sensing timing application in different unsynchronized radio-access-network cells. The method comprises:

performing the method of any of the embodiments of the method of the first aspect of the invention to determine a common sensing application time-base for the different positionally fixed wireless sensor stations;

receiving, from the different wireless sensor stations, sensing application messages comprising sensor data representing an identical remote-sensing event sensed by the different wireless sensor stations and respective sensing application time-stamps indicative of a point in time of the sensing of the remote-sensing event by the respective wireless sensor stations; and using the determined common application time-base and the received sensing application time-stamps to determine respective corrected sensing application time-stamps.

The method of the second aspect achieves an improvement in the accuracy of sensing times associated with a sensing event sensed by wireless sensor stations in unsynchronized RAN cells. Sensing event timing is useful for estimating or determining a position of occurrence of a sensing event detected by several wireless sensor stations. The accuracy of position determination depends on an accuracy of determination of a point of time, at which a sensing event is detected by different wireless sensor stations. For that reason, the proposed virtual synchronization of the wireless sensor stations improves the accuracy of position determination in unsynchronized networks by reducing or completely eliminating desynchronization, using the common application time-base on the side of the application server.

An absolute time of event occurrence is not important, but only a relative time, i.e., a time difference between an observation of an event by one sensor and an observation of the same event made by another sensor. For non-synchronized networks, where wireless sensor stations are connected to different base stations which are not time aligned, the only solution proposed in the prior art was to provide the wireless sensor stations with an absolute timing reference, e.g. by a DCF77 or GPS receiver. Using this extra hardware providing this absolute timing source, a relative timing difference could be accurately derived. However, such extra equipment is quite expensive and makes the installation process of the wireless sensor stations more complicated.

An embodiment of the method of the second aspect further comprises using the corrected sensing application time-stamps, sensor position data associated with the different positionally fixed wireless sensing stations, and a predetermined event-signal propagation speed to determine a distance between the respective wireless sensor station and an unknown geographical position of occurrence of the remote-sensing event; and using a plurality of the determined distances from the different wireless sensor stations to calculate the geographical position of occurrence of the remote-sensing event.

According to a third aspect of the present invention, a method for operating a wireless station is provided. The method comprises operating the wireless station as a positionally fixed end node in one of a plurality of different unsynchronized radio-access-network cells;

performing a timing application;

receiving a timing-report instruction; and, in response to receiving the timing-report instruction, performing a cell-search procedure, retrieving a cell identifier associated with the respective radio-access-network cell operated by any measured base station, determining timing synchronization data indicative of respective time synchronization information retrieved from any measured base station with reference to its respective time base;

if more than one set of timing synchronization data from a corresponding number of measured/evaluated base stations has been retrieved by a given one of the wireless stations, providing a timing report indicative of a respective desynchronization between the different time bases of the responding base stations.

The method of the third aspect is a complementary method to be performed by a wireless station in an exchange with an application server performing the method of the first aspect or one of its embodiments. Thus, for a more detailed explanation, reference is made to the explanations given in the context of the method of the first aspect.

An embodiment of the method of the third aspect further comprises receiving the timing-report instruction as an application layer protocol instruction on an application protocol layer;

processing the application layer protocol instruction to retrieve and execute an AT command for execution of the cell search procedure on at least one protocol layer that is below the application protocol layer.

Suitably, determining the time synchronization information associated with a given base station within the range of the user equipment comprises receiving from the base station a sequence of radio frames of known duration and divided into a predetermined number of subframes, which are of known duration and divided into a predetermined number of slots, which are of known duration and are divided into a predetermined number of symbols of known duration.

detecting predetermined synchronization signals in a known symbol at a predetermined slot of a radio frame to determine a slot boundary timing for inclusion in the time synchronization information.

The determination of the time synchronization information is thus based on prior knowledge for the detailed frame structure for a given wireless communication standard, such as UMTS or LTE. Since the same synchronization signals are determined for each detected base stations, a desynchronization between the base stations can be detected as a time shift in the detection of the synchronization signals.

According to a fourth aspect of the present invention, an application-synchronization server is provided for determining a common application time-base for different positionally fixed wireless stations, which are operated as end nodes in performing a timing application in different unsynchronized radio-access-network cells. The application timing server comprises a synchronization unit, which is configured to generate and provide to the wireless stations a timing-report instruction, the timing-report instructing the wireless stations to perform a cell-search procedure, to retrieve a cell identifier associated with the respective radio-access-network cell operated by any responding base station, to determine timing synchronization data indicative of respective time synchronization information retrieved from any responding base station with reference to its respective time base; and if more than one set of timing synchronization data from a corresponding number of responding base stations has been retrieved by a given one of the wireless stations, to provide a timing report indicative of a respective desynchronization between the different time bases of the detected base stations;

The synchronization unit is configured to determine and store a common application time-base for the different responding base stations, using the different sets of timing synchronization data provided in the timing report.

The application-synchronization server of the fourth aspect shares the advantages of the method of the first aspect of the invention.

According to a fifth aspect of the invention, a sensing-application server is provided for determining points in time associated with a remote-sensing event sensed by different remote, positionally fixed wireless sensor stations, which are operated as end nodes in performing a sensing timing application in different unsynchronized radio-access-network cells. The sensing-application server comprises:

an application-synchronization server for determining a common sensing application time-base for the different positionally fixed wireless sensor stations;

a sensing-time determination unit configured to receive, from the different wireless sensor stations, sensing application messages comprising sensor data representing an identical remote-sensing event sensed by the different wireless sensor stations and respective sensing application time-stamps indicative of a point in time of the sensing of the remote-sensing event by the respective wireless sensor stations;

to determine respective corrected sensing application time-stamps, using the determined common application time-base and the received sensing application time-stamps.

The sensing-application server of the sixth aspect shares the advantages of the method of the second aspect of the invention.

In an embodiment, the sensing-application server further comprises an event location determination unit, which receives the corrected sensing application time-stamps associated with the remote-sensing event and which is configured to determine, using respective sensor station location information indicative of a location of the different wireless sensor stations, the corrected sensing application time-stamps and a propagation speed of an event signal created by the remote-sensing event and detected by the wireless sensor stations, event distance information indicative of respective distance differences between the different wireless sensor stations and an event location;

and which is configured to estimate, using the event distance information determined for a plurality of wireless sensor stations, an event location associated with the remote-sensing event, event sensing times indicated by the corrected sensing application time stamps The sensing-application server of this embodiment thus uses the determined precise timing information of the corrected sensing application time-stamps to estimate an event location. The event location determination unit of this embodiment determines differences in the different times of flight of the signal created by the event up to detection by the different wireless sensor stations. The accuracy of the estimation increases with the number of wireless sensor stations that have detected the sensing event. With an increasing number of determined distance differences, ambiguity in the location estimation can be reduced, until there is only one location that fits all the determined distance differences. Depending on the nature of propagation of the signal created by the sensing event, different numbers of sensing application time stamps are sufficient to determine the exact location of the event. For illustration of this point, a location of generation of an acoustic impulse signal that propagates along a linear propagation medium such as the wall of a pipe or pipeline can be exactly determined using a smaller number of sensing application time stamps provided by wireless sensor stations. The required number of sensing application time stamps is higher if the propagation medium is a three-dimensional medium, such as the atmosphere.

The particular advantage of this embodiment is an improved precision of the location determination despite a lack of synchronization between the different wireless sensor stations. The precision is achieved by the use of the corrected sensing application time-stamps.

A sixth aspect of the present invention is provided by a computer program comprising executable program code instructing a programmable processor of a computer to perform a method for determining a common application time-base for different positionally fixed wireless stations, which are operated as end nodes in performing a timing application in different unsynchronized radio-access-network cells, the method comprising, in accordance with the first aspect of the invention.

Further aspects of the present invention are related to computer programs associated with the methods of the second and third aspects of the invention.

BRIEF DESCRIPTION OF THE DRAWINGS

In the following, further embodiments will be described with reference to the enclosed drawings. In the drawings:

FIG. 5 is an illustration of an example of a simple common application time base maintained by an application server.

Regarding terms used in the following part of the description, it is noted that different mobile communication standards have used different terms for corresponding entities. However, the terms used herein are not meant to be interpreted with respect to a particular standard or standard version, unless specified otherwise. Thus, as an example, the term base station will be used consistently herein, irrespective of whether the network node denoted is called a base station, NodeB or eNodeB or Home eNodeB in a respective standard. The term wireless station will be used, irrespective of whether the network node denoted is called a user equipment, or end node or other in a respective standard.

Figure 1:
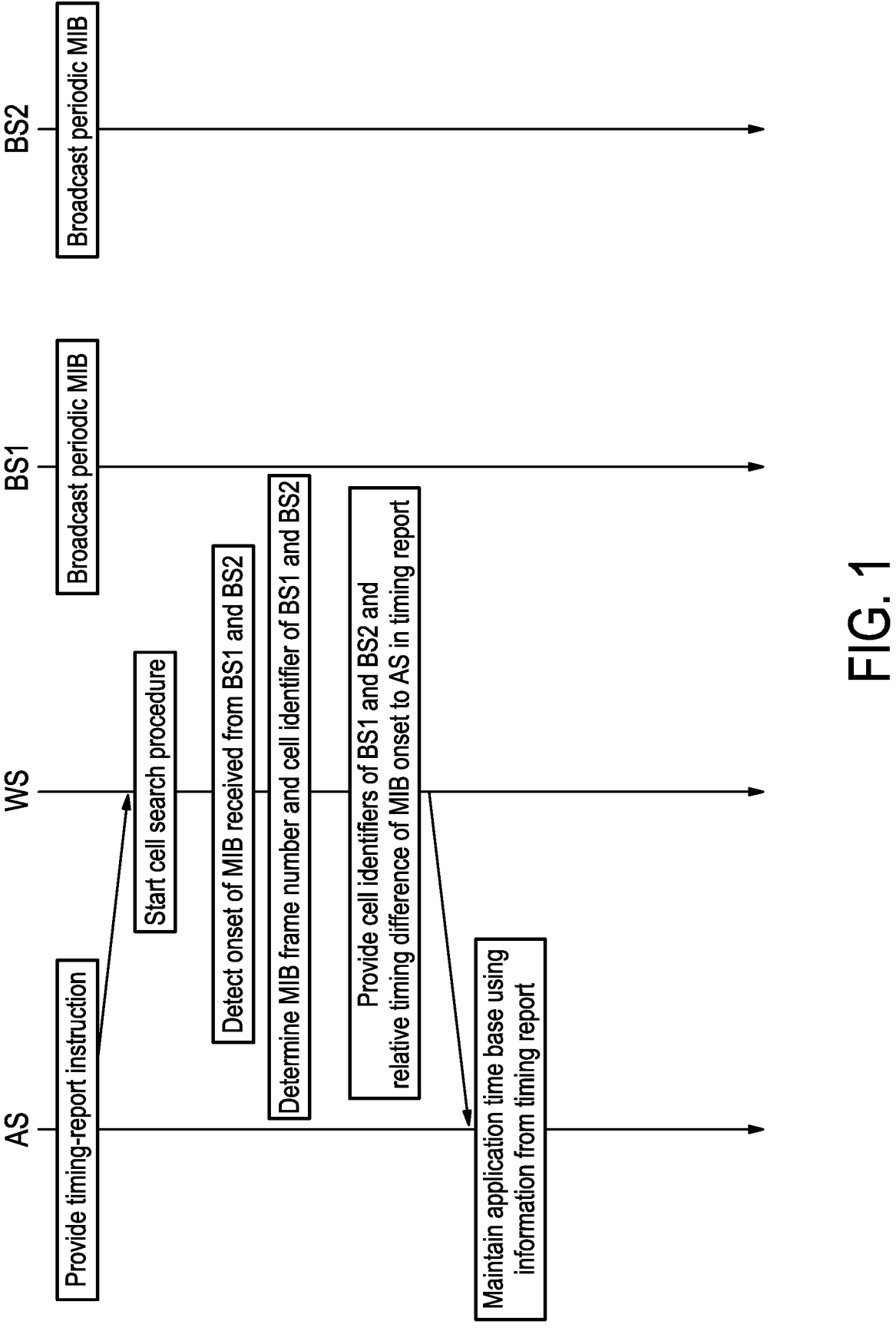
FIG. 1 is a process flow illustrating embodiments related to methods performed by an application server and by a wireless station in accordance with the present invention.

FIG. 1 is a process flow illustrating embodiments related to methods performed by an application server and by a wireless station in accordance with the present invention. The process flow shown in FIG. 1 includes performing different methods, namely, an application-server process 100 performed an the application server AS, and a wireless-station process 200 by a wireless station WS. The individual processes 100 and 200 performed by the application server AS and by the wireless station WS in the process flow of FIG. 1 each incorporate a respective aspect of the present invention. Base-station process steps described below in the context of the process flow of FIG. 1 are per se known and as such not claimed as separate aspects of the invention.

To illustrate the process flow, only two base stations BS1 and BS2 are shown as an example. However, according to the present invention, any number of detected base stations which is equal or larger than two can be involved in the process.

The process flow of FIG. 1 will be described below using the example of the LTE standard. However, this is to be understood as a non-limiting example. The present invention can be performed in the context of any standard for cellular wireless communication in the situation of a lack of synchronization between different cells of a given PLMN, or of different PLMNs, which are detectable by a given wireless station.

According to the process flow shown in FIG. 1, in a step S110 an application server AS provides a timing-report instruction to a positionally fixed wireless station WS.

In a typical field application, the application server maintains a list of wireless stations performing an application function controlled by the application server. The application server is also aware of the fixed position of any of the listed wireless stations. The fixed position of the wireless stations can for instance be stored in terms of geographical coordinates. To this end, an installation worker can determine the coordinates of a given wireless station at the time of original installation of the wireless station, using for instance a satellite positioning system such as GPS or Galileo.

It is noted, however, that the present invention does not rely on the wireless station WS being able to determine its position or receive precise satellite timing information, for example using a satellite positioning system receiver incorporated into the wireless station. In fact, as will become clear in view of the present specification, an advantage of the present embodiment is that it enables an application server achieving a virtual synchronization of timing information acquired by wireless stations from unsynchronized base stations for the purpose of application event timing, without requiring the wireless stations to rely on a common time base using the precise timing information provided by a satellite positioning system. Preferred embodiments of a wireless station for use with the present invention therefore do not comprise a receiver for positioning signals from a satellite positioning system. This allows keeping the hardware expenditure low for the wireless stations used in the field application.

The timing-report instruction of step 110 is typically, but not necessarily provided to a plurality of the listed wireless stations WS at the same time, for instance by a multicast message. As an example, either a complete set of wireless stations associated with the application server is commonly addressed by the timing-report instruction, or a subset of wireless stations WS, for instance only those of the set of wireless stations which are located in a certain geographical region.

In other embodiments, a particular pre-selected subset wireless stations is provided with the timing-report instruction. Specifically, by instructing only those wireless stations which are known to be located in an overlap region of different cells and thus will detect more than one base station in their cell-search procedure, all desynchronization information required by the application server AS to determine a common application time base can be acquired with a minimum signalling expenditure.

The timing-report instruction can be provided using any suitable communication channel, wired or wireless, depending on the requirements of a given application case, and on the communication capabilities of the wireless stations. In particular, some embodiments of the positionally fixed wireless stations may additionally be equipped for performing wired communication and thus receive the timing-report instruction through a wired communication channel. In preferred embodiments, however, a wireless communication channel is used, suitably via PLMNs the wireless stations are currently registered with.

While AT commands instructing a wireless station performing a cell search is as such known, there has not been an AT command that instructs the wireless station to determine time synchronization information from any detected base station with reference to its respective time base, and, if more than one set of timing synchronization data from a corresponding number of responding base stations has been retrieved by a given one of the wireless stations, to provide a timing report indicative of a respective desynchronization between the different time bases of the responding measured detected base stations.

Upon receiving the timing-report instruction from the application server, the wireless station WS initiates and performs a cell search procedure at step 220. An LTE cell search procedure includes a series of synchronization stages by which the wireless station WS determines time and frequency parameters necessary to demodulate downlink signals, to transmit with correct timing and to acquire system parameters.

LTE requires cell search procedures on two different occasions—for initial synchronization, and for detecting neighbour cells in preparation for handover. The cell search procedures are conducted mainly in the same way. A sole difference involves the question whether the cell has previously been identified or measured, and hence respective reference timing is maintained. Once a wireless station has detected or measured a cell and is camping on this cell or another cell, the timing stays nearly constant. A base station never drifts by more than 0.1 ppm according to related standard TS36.104.

The present invention adds the occasion of a cell search procedure upon instruction by an application server with the timing-report instruction. In the context of the present invention, the cell search procedure is to be performed even while the wireless station is already synchronized with one base station, and even though there is no reason for handover, or cell re-selection used in idle mode mobility which for a positionally fixed wireless station is normally not an issue. It should also be noted that in case such measurements have been conducted recently and for a positionally fixed device are hence still be considered to be accurate, these values may also be used for said purpose.

Moreover, for devices which have restricted the conducting of corresponding measurements for power saving reasons, such as relaxed monitoring according to TS36.304, which allows certain types of wireless stations to skip neighbour cell measurements while stationary or positionally fixed, the device may conduct said measurements upon receiving said command from its locally executed application or the connected application server.

Symbol timing synchronization determines the correct symbol start. Generally, under the LTE standard, communication is performed using a periodic time structure divided into hyperframes, each of which is comprised of 1024 system frames. The system frames in turn are each comprised of 1024 radio frames. More details of LTE frame structures are defined in TS36.211, incorporated herein by reference, in particular in the document version 3GPP TS 36.211 V16.2.0 (2020-06). In this standard document, section 4, pages 15 to 19 is concerned with detailed frame structures. A frame structure type 1 is described in section 4.1 with reference to FIG. 4.1-1, and is applicable to both full duplex and half duplex FDD only. A frame structure type 2 is described in section 4.2 with reference to FIG. 4.2-1, and is applicable to TDD only. Frame structure type 3 is described in section 4.3 and is applicable to LAA secondary cell operation with normal cyclic prefix only.

Figure 2:
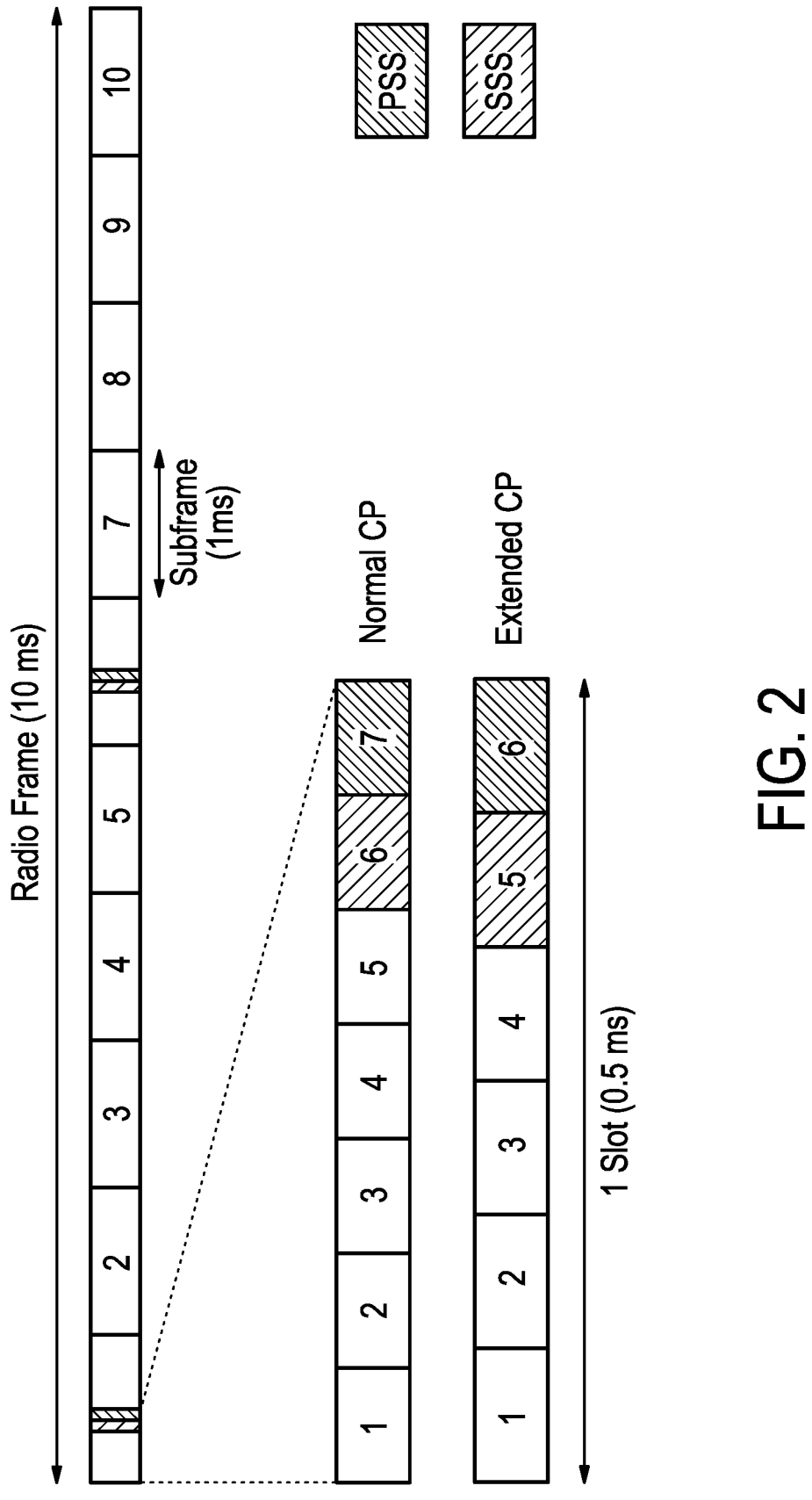
FIG. 2 is an illustration of a time structure of a radio frame used in the process flow of FIG. 1.

The structure of an exemplary radio frame is illustrated in FIG. 2, which in the following is additionally referred to. An individual radio frame is comprised of 10 sub-frames. Each radio frame has a duration of 10 milliseconds, each sub-frame has a duration of 1 millisecond. Each subframe has two slots of 0.5 milliseconds duration. Each slot has a fixed number of subslots, each having a number of chips (containing, e.g., m-symbols). Time intervals are multiples of a basic time unit $Ts=\frac{1}{30720000}$ second.

For detection by any wireless station within reach, every base station periodically broadcasts certain broadcast information, irrespective of a presence of any wireless station within a given cell. The base station uses a downlink physical broadcast channel (PBCH) to broadcasts a limited number of parameters essential for initial access of the cell such as downlink system bandwidth, and the most significant eight-bits of the System Frame Number. These parameters are carried in a Master Information Block (MIB) which is 14 bits long. The PBCH is designed to be detectable without prior knowledge of system bandwidth and to be accessible at the cell edge.

The timing of the MIB, i.e., its locations in a given system frame, is fixed. A new MIB is sent every four radio frames in sub-frame number 0 of a radio frame by a given base station, i.e., every 40 milliseconds. Among the information sent with each MIB is its system frame number. The system frame number in a given MIB is a rolling number between 0 and 1023 and changes with every new MIB. Since the transmission periodicity between two transmissions on the physical broadcast channel is 10 milliseconds and a new MIB is sent only every 40 milliseconds, four consecutive system frames on the physical broadcast channel contain the same system frame number. Furthermore, a fixed number of system information blocks (SIB) are broadcast by the base station on a physical downlink shared channel (PDSCH). A first SIB, SIB1, is sent in sub-frame number 5 of the radio frame and comprises time scheduling and periodicity information of the further SIBs. Each 80 ms a new SIB1 is broadcast. A current SIB1 is retransmitted every 20 milliseconds.

Time synchronization signals are transmitted twice per radio frame. Specifically, for obtaining time synchronization information, a wireless station uses two dedicated signals broadcast on each cell by the respective base station: a Primary Synchronization Sequence (PSS) and a Secondary Synchronization Sequence (SSS). Using these signals, the wireless station acquires the time synchronization information, to the frame of LTE without however actually performing time synchronization with the respective base station, except for the base station the wireless station is currently attached to.

The synchronization signals are transmitted in the last and the last but one OFDM symbol of the first subframe of a frame. Once frame synchronization is achieved, the device can read the MIB to detect the frame number and monitors change to next frame number or whether it stays constant, so it knows finally in which frame it is by deriving the corresponding frame number. The MIB frame number changes every 4 frames, so it is always increased by 4. In case it is the first frame with said number, the frame number is correct as indicated, in case it is $2^{nd}$ frame, i.e. the first frame after MIB, the frame number is increased by 1, and so on, unit the $3^{rd}$ frame after MIB. The actual SFN is the SFN carried in the MIB+3.

Figure 3:
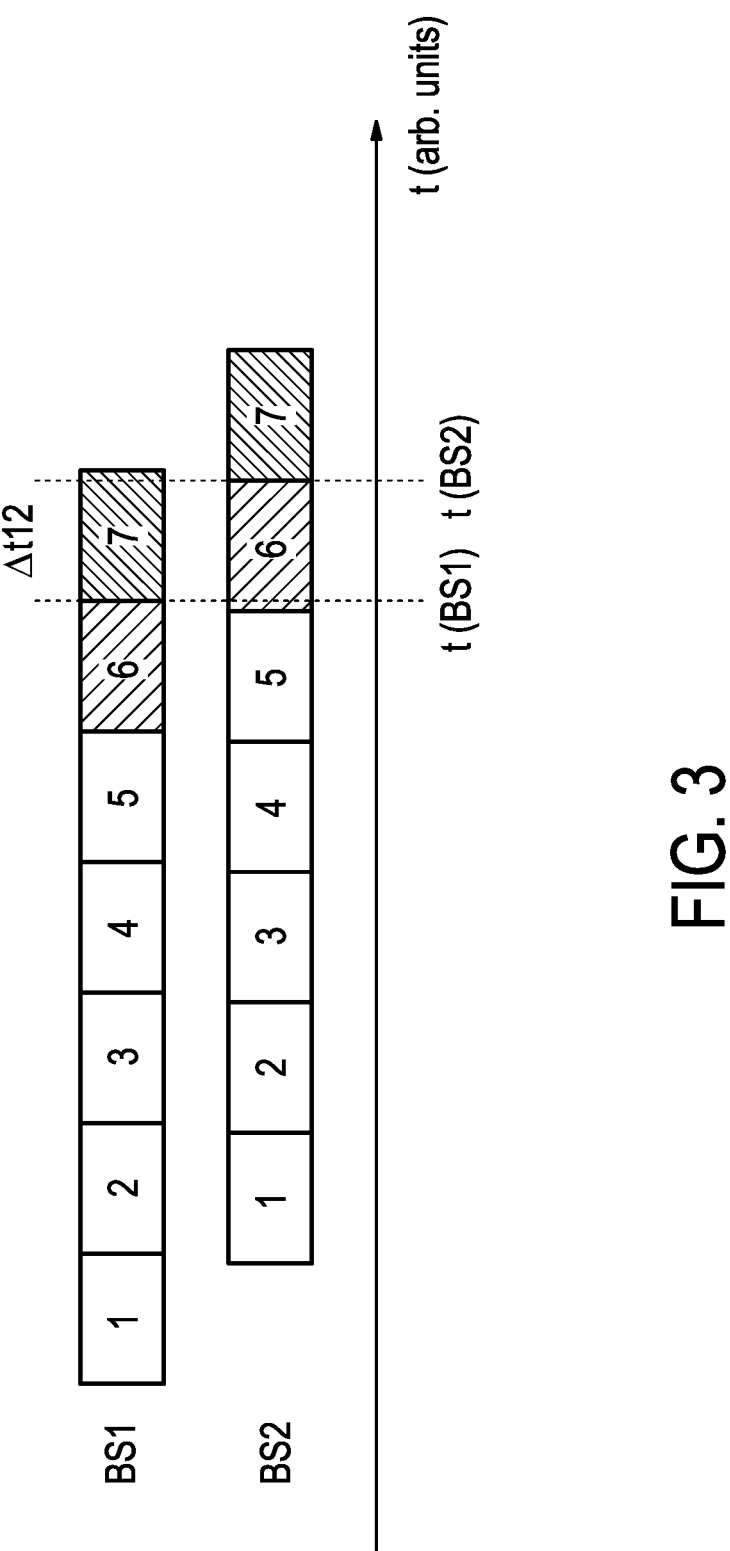
FIG. 3 is an illustration of a measurement of time synchronization information from two base stations.

Referring additionally to FIG. 3, the determined time synchronization information is retrieved by the wireless station from each detected base station for the same PSS signal in a respective system frame with the same system frame number. The PSS signal is the same for any given cell in every sub-frame in which it is transmitted. The PSS is located in the last OFDM symbol of the first and 11th slot of each radio frame. The location of the SSS immediately precedes the PSS in the penultimate symbol of the first and 11th slot of each radio frame. In the present example, the time synchronization information retrieved from the two base stations BS1 and BS2 includes the times t(BS1) and t(BS2) measured at the onset of the PSS signal in the first subframe of a radio frame by the wireless station WS. The wireless station WS detects the slot boundary and thus the position of the 10 ms frame boundary based on a-priori knowledge that the SSS signal alternates in a specific manner between two transmissions. In particular, the SSS uses pre-defined and thus detectable m-sequences. The wireless station also retrieves from the PSS and SSS a cell identifier.

Since the PSS and SSS occupy the central six resource blocks in the frequency domain, irrespective of the system channel bandwidth, the wireless station is able obtain the time synchronization information of the base station without a-priori knowledge of allocated bandwidth.

Thus, the wireless station WS retrieves as a set of time synchronization information from each detectable base station the following:

a point in time, with reference to its current time base, i.e., the time base of the base station it is currently attached to, of a slot boundary (onset) of the PSS in the first slot of a sub-frame number 0 of a radio frame comprising a MIB.

a system frame number associated with the MIB; and a cell identifier.

In view of the mentioned renewal rate of the MIB involving a repetition of the system frame number in four consecutive system frames including the system frame comprising the last MIB, it may be necessary to wait for detecting the next new MIB before the position of an individual system frame between two consecutive transmissions of the MIB can be identified unambiguously. Since desynchronization of unsynchronized network cells is typically less than 10 milliseconds, this will apply to all detected base stations and therefore typically not a necessary measure to achieve precise timing. However, it is an optional measure to avoid any errors in case of an unusual stronger desynchronization.

This way, for the example of an LTE PLMN with unsynchronized RAN cells, the wireless station determines for each detected base station a corresponding point in time of a frame boundary (onset) of a corresponding specified system frame.

The method as outlined above can also be used to evaluated the timing difference to any other communication system. For the case of PLMNs operating in accordance with other cellular radio communication standards, the same process is applied, using a specified system frame in accordance with the given cellular radio communication standard.

A very similar frame structure to LTE is used in New Radio (NR)/5G, as defined in TS38.211. The document version 3GPP TS 38.211 V16.2.0 (2020-06), which is incorporated herein by reference, in section 4, in particular section 4.3 on pages 12 and 13, defines the structure of frames, subframes (section 4.3.1) and slots (section 4.3.2).

For applying said method to NR, also the subcarrier spacing needs to be considered. LTE has a subcarrier spacing of 15 kHZ. The same may be used in NR, leading to a slot/frame duration of 1 ms respectively 10 ms. In case NR uses a subcarrier spacing of 30 kHz, the duration is reduced accordingly by the same factor. A duplication of the subcarrier spacing leads to a ½ reduction in the duration in time. A 60 kHz subcarrier spacing to ¼ of the time duration. Otherwise said timings stay constant.

It can be assumed that in frequencies normally considered for timing synchronization applications also NR may only use 15 KHz subcarrier spacing. However, as outlined, the method is not restricted to that scenario. Hence, for using the method of the invention for performing LTE to NR timing evaluations, an indication on the subcarrier spacing applied for NR is advantageous.

In case of UMTS the frame duration is also 10 ms. Each frame has a corresponding frame number. However, a UMTS frame is divided in 15 slots and has 3.64 Mcps.

When calculating timing differences, thus, it is only necessary to indicate which system was measured and, in case of NR, which configuration it had.

And also when involving a system such as GSM, which is not based on a 10 ms frame structure, the corresponding timing difference can be evaluated. The GSM frame structure is designated as hyperframe, superframe, multiframe and frame. The minimum unit is a frame (or TDMA frame) and is made of 8 time slots and each time slot has 15/26 or 0.577 ms of time duration. Measuring GSM and maintaining related timing for mobility purposes is known since long time, refer to TS25.133 for UMTS to GSM measurements or TS36.133 for LTE to GSM measurements.

Thus, LTE was used in the description hereinabove only as a reference embodiment, and for sure forms an embodiment currently considered important for field application. However, the methods disclosed herein are not restricted to the LTE radio standard. Rather, the preceding paragraphs show that the timing evaluation according to the present invention between the given cell the wireless station WS is currently connected to or camping on, and a neighbour cell on a different frequency, which is based on a different radio system, is feasible without problem. The same method is applied, thus, performing an evaluation of the timing difference between two specified frame numbers, which preferably, but not necessarily is frame 0, and indicating to the application server AS which kind of system the other radio is, and, in case of NR, also including configuration information such as subcarrier spacing or frame duration, in case this is flexible as for NR (a main feature of NR is a flexible layer 1/physical layer).

In any case, the wireless station WS uses its current time base for determining the different sets of time synchronization information from the different base stations it detects during the cell search procedure. Thus, by providing the determined sets of time synchronization information to the application server, the wireless station WS enables the application server AS to calculate the desynchronization between the base stations BS1 and BS2 detected by the wireless station WS.

Figure 4:
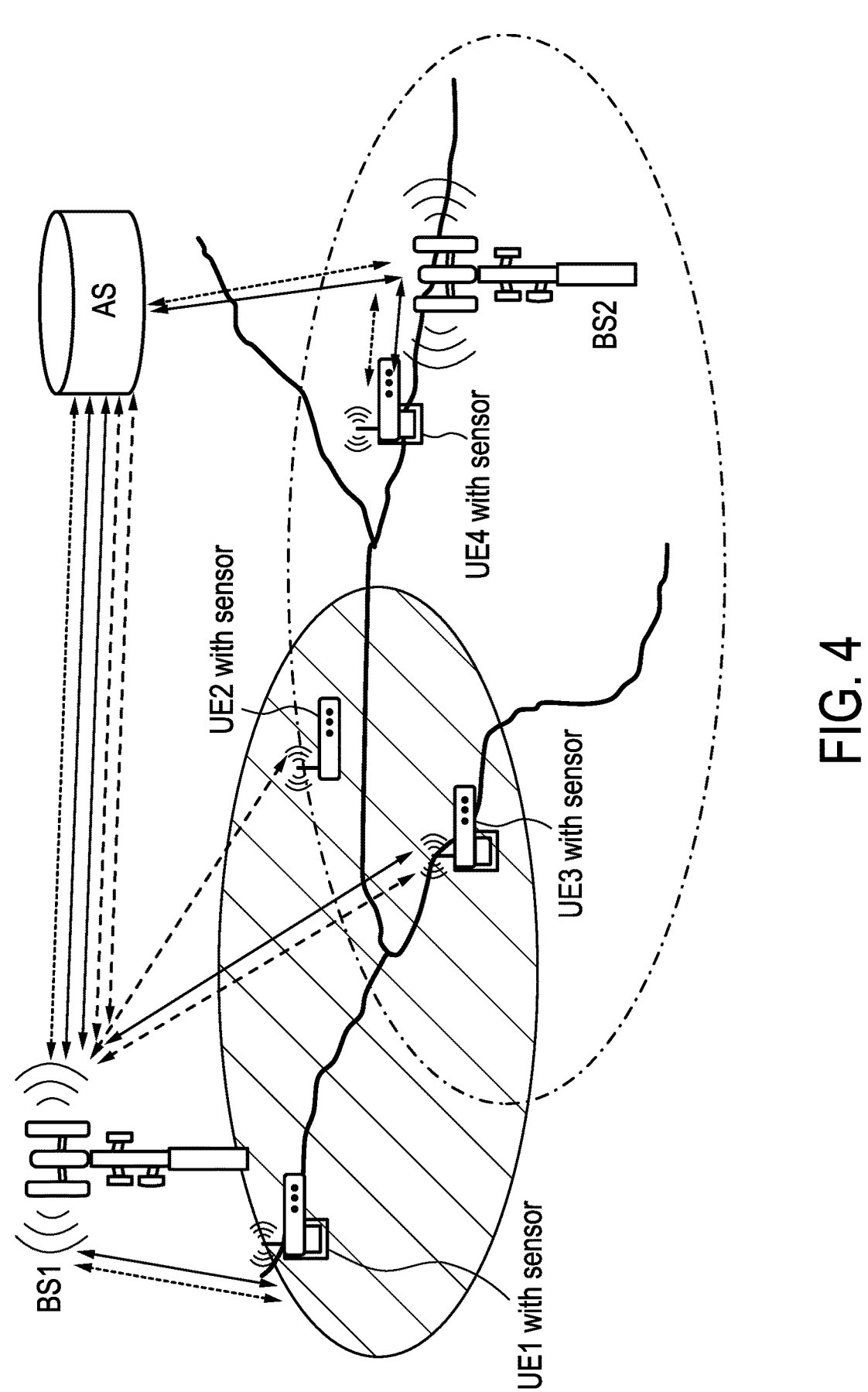
FIG. 4 is an illustration of a sensor timing arrangement for detecting the position of a leak in a pipeline system.

FIG. 4 is an illustration of a sensor timing arrangement for detecting the position of a leak in a pipeline system. Four positionally fixed wireless stations UE1 to UE4 are distributed in a geographical region along a pipeline system. Wireless sensor stations UE1, UE3 and UE4 are attached to the pipeline and include acoustical sensors to detect vibrational waves propagating along the wall of the pipeline upon a event, for instance an object hitting the wall of the pipeline.

A further wireless station UE2 has no sensor function. The stations UE1 to UE3 are arranged in a cell coverage of a base station BS1, the stations UE2 to UE4 are arranged in the cell coverage of a base station BS2. The base stations BS1 and BS2 are unsynchronized, since they are part of a non-synchronized network or are on different frequencies or even from different operators/technologies. The stations UE2 and UE3 are thus arranged in an overlap region of the cells served by the base stations BS1 and BS2. An application server AS manages operation of the wireless stations UE1 to UE4. Any sensing event detected by a wireless sensor station is reported to the application server AS. A sensor report of a sensed event includes an identity of the wireless sensor station and timing information of the sensed event.

In order to determine a location of an event sensed, the application servers evaluates sensor reports received from different wireless sensor stations. However, since the base stations BS1 and BS2 are not synchronized, the timing information provided in the different sensor reports refers to different time bases provided to the wireless stations by the base station to which they are attached. That is, the wireless sensor stations UE1 and UE4 operate using different time bases. The wireless sensor station UE3 may operate on either one of the time bases of base stations BS1 and BS2, depending on which base station it is attached to.

To avoid the inaccuracy of timing and thus position information, the application server maintains an application time base. It issues a timing-report instruction to the wireless stations UE1 to UE4, instructing the wireless stations to perform a cell-search procedure, to retrieve a cell identifier associated with the respective radio-access-network cell operated by any responding base station, to determine a respective set of time synchronization information retrieved from any detected base station with reference to its respective time base. If more than one set of time synchronization information from a corresponding number of detected base stations has been retrieved by a given one of the wireless stations, the corresponding wireless station is to provide a timing report comprising timing synchronization data indicative of the retrieved sets of time synchronization information retrieved for the detected base stations.

In the example arrangement illustrated in FIG. 4, the timing report of UE2 and UE3 allows the application server AS to evaluate and calculate a desynchronization, i.e. a difference of the time bases between the base stations BS1 and BS2. In evaluating the timing reports received, the application server cancels the effect of the timing advance between the base station and a given wireless station, based on their known fixed positions. This way, the application server AS derives a common application time base for all wireless sensor stations and is able to correct the timing information comprised in the sensor reports to accurately determine a point in time of a sensing. Based on knowledge on stability, the application server maintains the application time base accurate by providing further timing-report instructions. To optimize signalling efficiency, only UE2 and UE3 need to be instructed with updates because these wireless stations are the only ones that can provide the information required to maintain the application time base. Generally, the information obtained can be used by the application server for a long time, because a base station has an accuracy of its time base better than 0.1 ppm.

The method can also be used for equipment distributed to different operators.

Thus, the described virtual synchronization in the application server avoids additional equipment installation, and provides a service to evaluate said sensor reports and match them in time based on the radio measurements conducted by the wireless stations and delivered to the application server also. The delivery of said timing measurements can be done earlier and stored in the respective server, as all stations itself are stable in time.

In embodiments performing event localization, the accuracy of localization may be further improved by using besides just the related frame timing difference seen from said base-stations also the distance to the respective base stations. Either the event location determination unit estimates the difference via the experienced path loss of said neighbour base station signal RSCP or depending on the radio system a similar reference signal.

In addition, the positioning may benefit from LTE being a frequency time grid, i.e. all signals have to arrive at the base station in a certain time grid. To achieve this, a base station applies the so called timing advance TA to any of the devices it is connected to. This means that a device shortly sends a message to the neighbour base station which replies with corresponding timing advance, and hence the wireless sensor station knows the travelling time of its signal to said base station and can evaluate the distance. However, that increased positioning would be achieved at the cost of a small momentary increased interference situation for the network, i.e., sending signals to a base station being further away to just evaluate the traveling time and not intending to do a connection set-up.

A simplified example of a common application time base maintained by the application server AS is shown in FIG. 5. The common application time base takes the form of a table collecting information used for the synchronization of 4 base stations BS1 to BS4. For each base station, the reporting wireless stations, the timing difference and the required timing correction (in units of Ts) are listed.

Thus, according to the present invention, to determine a common application time-base for different positionally fixed wireless stations, which perform a timing application in different unsynchronized radio-access-network cells, a method comprises providing to the wireless stations a timing-report instruction. It instructs the wireless stations to perform a cell-search procedure and to determine a respective set of time synchronization information retrieved from any detected base station with reference to its respective time base. If more than one set of time synchronization information from a corresponding number of detected base stations has been retrieved, the wireless stations provides timing synchronization data indicative of the retrieved sets of time synchronization information from the detected base stations. An application server receives the at least one timing report and determines a common application time-base for the different detected base stations, using the different sets of timing synchronization data provided.

The invention claimed is:

1. A method for determining respective sensing times associated with a sensing event sensed by different remote, positionally fixed wireless sensor stations, which are operated as end nodes in performing a sensing timing application in different unsynchronized radio-access-network cells, the method comprising:

determining a common sensing application time-base for the different positionally fixed wireless stations, which are operated as end nodes in performing a timing application in the different unsynchronized radio-access-network cells by:

providing to the wireless stations a timing-report instruction, the timing-report instructing the wireless stations to:

perform a cell-search procedure, retrieve a cell identifier associated with the respective radio-access-network cell operated by any responding base station, determine a respective set of time synchronization information retrieved from any detected base station with reference to its respective time base;

in response to determining that more than one set of time synchronization information from a corresponding number of detected base stations has been retrieved by a given one of the wireless stations, provide a timing report comprising timing synchronization data indicative of the retrieved sets of time synchronization information retrieved for the detected base stations;

receiving at least one timing report from at least one wireless station;

determining a common application time-base for the different detected base stations, using the different sets of timing synchronization data provided in the timing report;

receiving, from the different wireless sensor stations, sensing application messages comprising sensor data representing an identical remote-sensing event sensed by the different wireless sensor stations and respective sensing application time-stamps indicative of a point in time of the sensing of the remote-sensing event by the respective wireless sensor stations; and using the determined common application time-base and the received sensing application time-stamps to determine respective corrected sensing application time-stamps.

2. The method of claim 1, comprising providing the timing-report instruction as an application layer protocol instruction on an application protocol layer.

3. The method of claim 1, comprising:

performing the method of claim 1 at different points in time in a plurality of repetition runs; and using the sets of timing synchronization data obtained in the different repetition runs to determine the common application time-base for the different responding base stations.

4. The method of claim 1, wherein determining the common application time-base for the different responding base stations from a given timing report comprises:

determining the respective desynchronization between the different time bases of the responding base stations;

determining a timing correction associated one of the time bases, for use in correcting timing information provided in a time stamp provided with reference to the time base.

5. The method of claim 1, further comprising:

using the corrected sensing application time-stamps, sensor position data associated with the different positionally fixed wireless sensing stations, and a predetermined event-signal propagation speed to determine a distance between the respective wireless sensor station and an unknown geographical position of occurrence of the remote-sensing event;

using a plurality of the determined distances from the different wireless sensor stations to calculate the geographical position of occurrence of the remote-sensing event.

6. A computer program comprising executable program code instructing a programmable processor of a computer to perform the method of claim 1.

7. A method for operating a wireless station, the method comprising:

operating the wireless station as a positionally fixed end node in one of a plurality of different unsynchronized radio-access-network cells;

performing a timing application;

receiving a timing-report instruction; and in response to receiving the timing-report instruction;

performing a cell-search procedure, retrieving a cell identifier associated with the respective radio-access-network cell operated by any measured base station, determining timing synchronization data indicative of respective time synchronization information retrieved from any measured base station with reference to its respective time base;

in response to determining that more than one set of timing synchronization data from a corresponding number of measured/evaluated base stations has been retrieved by a given one of the wireless stations, providing a timing report indicative of a respective desynchronization between the different time bases of the responding base stations;

wherein determining the time synchronization information associated with a given base station within the range of the wireless station comprises:

receiving from the base station a sequence of radio frames of known duration and divided into a predetermined number of subframes, which are of known duration and divided into a predetermined number of slots, which are of known duration and are divided into a predetermined number of symbols of known duration; and detecting predetermined synchronization signals in a known symbol at a predetermined slot of a radio frame to determine a slot boundary timing for inclusion in the time synchronization information.

8. The method of claim 7, further comprising receiving the timing-report instruction as an application layer protocol instruction on an application protocol layer;

processing the application layer protocol instruction to retrieve and execute an attention (AT) command for execution of the cell search procedure on at least one protocol layer that is below the application protocol layer.

9. A computer program comprising executable program code instructing a programmable processor of a computer of a wireless station to perform the method of claim 7.

10. The method of claim 7, wherein the predetermined synchronization signals comprise Primary Synchronization Sequence (PSS) and a Secondary Synchronization Sequence (SSS).

11. A sensing-application server for determining points in time associated with a remote-sensing event sensed by different remote, positionally fixed wireless sensor stations, which are operated as end nodes in performing a sensing timing application in different unsynchronized radio-access-network cells, the sensing-application server comprising:

an application-synchronization server for determining a common sensing application time-base for the different positionally fixed wireless sensor stations, the application server comprising:

a synchronization unit, which is configured to generate and provide to the wireless stations a timing-report instruction, the timing-report instructing the wireless stations to:

perform a cell-search procedure, retrieve a cell identifier associated with the respective radio-access-network cell operated by any responding base station, to determine timing synchronization data indicative of respective time synchronization information retrieved from any responding base station with reference to its respective time base;

in response to determining that more than one set of timing synchronization data from a corresponding number of responding base stations has been retrieved by a given one of the wireless stations, provide a timing report indicative of a respective desynchronization between the different time bases of the detected base stations;

wherein the synchronization unit is configured to determine and store a common application time-base for the different responding base stations, using the different sets of timing synchronization data provided in the timing report; and a sensing-time determination unit configured to:

receive, from the different wireless sensor stations, sensing application messages comprising sensor data representing an identical remote-sensing event sensed by the different wireless sensor stations and respective sensing application time-stamps indicative of a point in time of the sensing of the remote-sensing event by the respective wireless sensor stations; and determine respective corrected sensing application time-stamps, using the determined common application time-base and the received sensing application time-stamps.

12. The sensing-application server of claim 11, further comprising an event location determination unit, which receives the corrected sensing application time-stamps associated with the remote-sensing event and which is configured to:

determine event distance information indicative of respective distance differences between the different wireless sensor stations and an event location using:

respective sensor station location information indicative of a location of the different wireless sensor stations, the corrected sensing application time-stamps, and a propagation speed of an event signal created by the remote-sensing event and detected by the wireless sensor stations; and estimate, using the event distance information determined for a plurality of wireless sensor stations, an event location associated with the remote-sensing event, event sensing times indicated by the corrected sensing application time stamps.

\* \* \* \* \*